(12) United States Patent
Tanaka

(10) Patent No.: US 11,299,153 B2
(45) Date of Patent: Apr. 12, 2022

(54) VEHICLE TRAVELING CONTROL APPARATUS

(71) Applicant: Toyota Jidosha Kabushiki Kaisha, Toyota (JP)

(72) Inventor: Yusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 16/825,157

(22) Filed: Mar. 20, 2020

(65) Prior Publication Data
US 2020/0298852 A1 Sep. 24, 2020

(30) Foreign Application Priority Data
Mar. 22, 2019 (JP) .............................. JP2019-054992

(51) Int. Cl.
*B60W 30/14* (2006.01)
*B60W 40/09* (2012.01)
*B60W 40/06* (2012.01)
*B60W 10/18* (2012.01)
*G06K 9/00* (2006.01)
(Continued)

(52) U.S. Cl.
CPC .......... *B60W 30/146* (2013.01); *B60W 10/04* (2013.01); *B60W 10/18* (2013.01); *B60W 40/06* (2013.01); *B60W 40/09* (2013.01); *G06K 9/00798* (2013.01); *B60W 2040/0818* (2013.01); *B60W 2540/26* (2013.01); *B60W 2552/53* (2020.02)

(58) Field of Classification Search
CPC ................. B60W 10/04; B60W 10/18; B60W 2040/0818; B60W 2540/10; B60W 2540/12; B60W 2540/18; B60W 2540/26; B60W 2552/05; B60W 2552/53; B60W 2720/10; B60W 2720/106; B60W 30/12; B60W 30/143; B60W 30/146; B60W 30/18063; B60W 30/181; B60W 40/06; B60W 40/08; B60W 40/09; G06K 9/00798; G06K 9/00818
See application file for complete search history.

(56) References Cited

U.S. PATENT DOCUMENTS 9,495,874 B1 * 11/2016 Zhu ..................... G06K 9/00805
9,925,987 B1 * 3/2018 Nguyen ............... G08G 1/0129
(Continued)

FOREIGN PATENT DOCUMENTS

| JP | 2008-195402 A | 8/2008 |
| JP | 4172434 B2 | 10/2008 |

(Continued)

*Primary Examiner* — Babar Sarwar
(74) *Attorney, Agent, or Firm* — Dinsmore & Shohl LLP

(57) ABSTRACT

A vehicle traveling control apparatus comprises a driving support ECU. The driving support ECU determines whether or not a driver of a vehicle is under an abnormal state where the driver losses an ability to drive the vehicle. The driving support ECU executes a deceleration control to decelerate the vehicle after an abnormal determination time point at which it is determined that the driver is under the abnormal state. The driving support ECU decelerates a vehicle speed of the vehicle to within a predetermined low vehicle speed range and thereafter, causes the vehicle to travel at a speed within the low vehicle speed range.

3 Claims, 7 Drawing Sheets

(51) Int. Cl.
    *B60W 10/04*     (2006.01)
    *B60W 40/08*     (2012.01)

(56)     References Cited

U.S. PATENT DOCUMENTS

| | | |
|---|---|---|
| 10,597,030 B2 * | 3/2020 | Matsumura ............ B60W 40/08 |
| 2005/0270145 A1 | 12/2005 | Kataoka et al. |
| 2006/0025918 A1 | 2/2006 | Saeki |
| 2013/0162794 A1 | 6/2013 | Wakiyama |
| 2015/0166062 A1 * | 6/2015 | Johnson ................. B60W 10/20 701/41 |
| 2015/0375757 A1 * | 12/2015 | Schiek ................... B60K 35/00 701/23 |
| 2016/0071418 A1 * | 3/2016 | Oshida ................ B60W 30/165 701/23 |
| 2017/0174210 A1 * | 6/2017 | Choi ..................... B60W 10/20 |
| 2017/0297566 A1 * | 10/2017 | Matsumura ............ B60K 28/06 |
| 2017/0297567 A1 * | 10/2017 | Matsumura ............ B60W 40/08 |
| 2017/0369043 A1 * | 12/2017 | Otake .................... B60K 28/06 |
| 2017/0369044 A1 * | 12/2017 | Otake .................... B60T 17/22 |
| 2018/0037112 A1 * | 2/2018 | Otake ................. B60W 10/184 |
| 2018/0037226 A1 * | 2/2018 | Otake ............... B60W 50/0098 |
| 2018/0181820 A1 * | 6/2018 | Ide ......................... G08G 1/167 |

FOREIGN PATENT DOCUMENTS

| | | |
|---|---|---|
| JP | 4349210 B2 | 10/2009 |
| JP | 2010-6279 A | 1/2010 |
| JP | 4929777 B2 | 5/2012 |
| JP | 2013-152700 A | 8/2013 |
| JP | 2014-148293 A | 8/2014 |
| JP | 2017-190047 A | 10/2017 |
| JP | 2017-190048 A | 10/2017 |
| JP | 2018-103863 A | 7/2018 |

* cited by examiner

VEHICLE TRAVELING CONTROL APPARATUS

CROSS-REFERENCE TO RELATED APPLICATIONS

This application claims priority to Japanese Patent Application No. JP2019-054992 filed Mar. 22, 2019, the content of which is hereby incorporated by reference in its entirety into this application.

BACKGROUND

1. Technical Field

The present disclosure relates to a vehicle traveling control apparatus to automatically decelerate a vehicle (in order to stop the vehicle) when a driver falls into an abnormal state (hereinafter, also referred to as an "inability-in-driving abnormality state") in which the driver loses an ability to drive the vehicle.

2. Description of the Related Art

A vehicle traveling control apparatus (hereinafter, referred to as a "conventional apparatus"), which has been conventionally known, determines whether or not a driver is under an inability-in-driving abnormality state.

When it is determined that the driver is under the inability-in-driving abnormality state, the conventional apparatus stops the vehicle automatically (refer to Japanese Patent Application Laid-Open No. 2017-190047).

When it is determined that the driver is under the inability-in-driving abnormality state, the conventional apparatus stops the vehicle automatically regardless of a type of a road on which the vehicle is traveling. However, when the vehicle traveling on a general road with intersections, railroad crossings, and the like is automatically stopped, the vehicle may sometimes be stopped at one of places where the vehicle which is stopped obstructs smooth traffic of other vehicles. For example, the places include the intersections, the railroad crossings, and the like. Hereinafter, the place where the smooth traffic of other vehicles are obstructed by the stopped vehicle is referred to as an "inappropriate place".

SUMMARY

The present disclosure has been made in order to cope with the above-mentioned problem. That is, one of objects of the present disclosure is to provide a vehicle traveling control apparatus (hereinafter, also referred to as a "present disclosure control apparatus") capable of decreasing a possibility that the vehicle driven by a driver who is under an inability-in-driving abnormality state is stopped at an inappropriate place.

The present disclosure control apparatus is a vehicle traveling control apparatus applied to a vehicle comprising:
an information obtaining device (16, 17, 80-83) configured to obtain information at least on a road on which the vehicle is traveling;
an actuator (21, 31) configured to control a driving force of the vehicle and a brake force of the vehicle; and
a control unit (10).
The control unit is configured to:
determine whether or not a driver of the vehicle is under an abnormal state where the driver losses an ability to drive the vehicle (refer to steps 220 to 270);
determine whether or not the vehicle is on a vehicle exclusive road based on the information (refer to step 420 and step 520); and
execute a deceleration control using the actuator to decelerate the vehicle after an abnormal determination time point at which it is determined that the driver is under the abnormal state (refer to step 310 and step 340).

The control unit is configured to, after the abnormal determination time point:
decrease a speed of the vehicle to zero to thereby stop the vehicle through the deceleration control (step 330 and step 340) when it is determined that the vehicle is on the vehicle exclusive road (refer to a "Yes" determination at step 320); and
decrease the speed of the vehicle to a predetermined vehicle speed (SPDlow) which is within a low vehicle speed range which is higher than zero (refer to a "No" determination at step 360 and step 340) through the deceleration control, and thereafter, continue causing the vehicle to travel at a low speed within the low vehicle speed range (refer to a "Yes" determination at step 360 and step 370), when it is determined that the vehicle is not on the vehicle exclusive road (refer to a "No" determination at step 320).

The present disclosure control apparatus stops the vehicle through the deceleration control when it is determined that the vehicle is located on the exclusive road, after the abnormal determination time point which is a time point at which it is determined that the driver is under the abnormal state (the inability-in-driving abnormality state). In contrast, after the abnormal determination time point, the present disclosure control apparatus decreases the vehicle speed of the vehicle to "the predetermine speed (determination vehicle speed) higher than zero" through the deceleration control, and thereafter, causes the vehicle to travel at the low speed, when it is determined that the vehicle is not located on the vehicle exclusive road.

Therefore, the present control apparatus can decrease a possibility that the vehicle is stopped at the inappropriate place. Furthermore, since the present disclosure control apparatus causes the vehicle to travel at the low speed, it can decrease a chance to giving the risk/threat to users of the road (for example, pedestrians and bicycles) other than motor vehicles.

In one of aspects of the present disclosure control apparatus,
the information obtaining device includes:
an imaging device (17) configured to photograph a peripheral area of the vehicle to thereby obtain image data; and
a vehicle speed sensor (16) configured to detect the speed (SPD) of the vehicle. Furthermore, the control unit is configured to:
determine whether or not each of a first condition and a second condition is satisfied, the first condition being a condition, to be satisfied when a lane width (W) is equal to or larger than a lower limit lane width (WLoth), the lane width being a distance between a left lane marker on a left side of the vehicle and a right lane marker on a right side of the vehicle, the left and right markers being recognized based on road image data corresponding to a road included in the image data, the second condition being a condition to be satisfied when the obtained speed (SPD) is equal to or higher than a lower limit vehicle speed threshold (SPDLoth); and determine that the vehicle is on the vehicle exclusive road (refer to step 420 and step 430) when both of the first condition and the second condition are determined to be satisfied.

According to the above-mentioned aspect, it can determine whether or not the vehicle is on the vehicle exclusive road, using the lane width and the speed of the vehicle.

In the above description, references used in the following descriptions regarding embodiments are added with parentheses to the elements of the present disclosure, in order to assist in understanding the present disclosure. However, those references should not be used to limit the scope of the disclosure.

DETAILED DESCRIPTION OF THE EMBODIMENT

<Construction>

Figure 1:
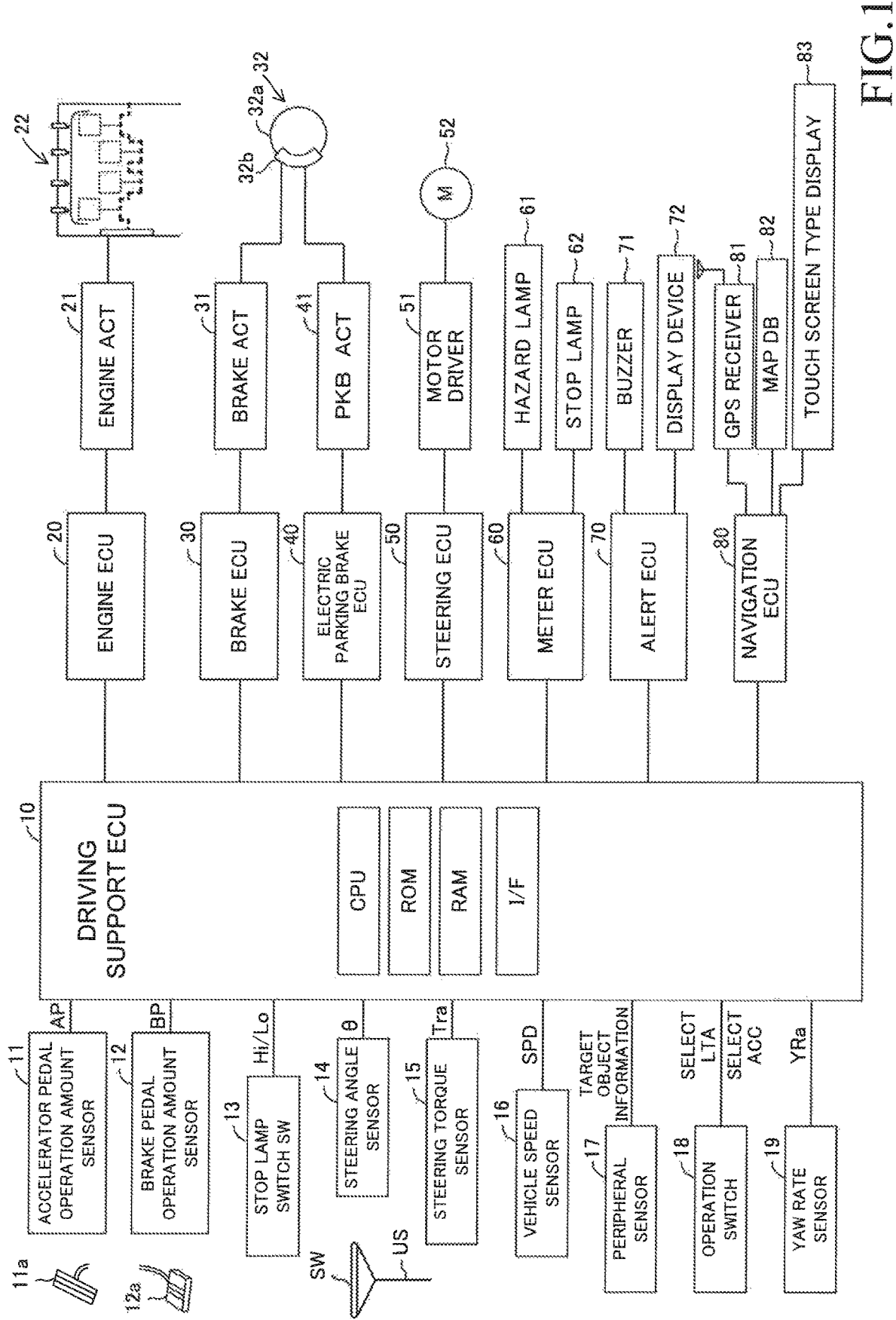
FIG. 1 is a schematic configuration diagram illustrating a vehicle traveling control apparatus according to the present disclosure.

A vehicle traveling control apparatus according to an embodiment of the present disclosure (hereinafter, referred to as an "embodiment apparatus" in some cases) is applied to a vehicle (hereinafter, referred to as an "own vehicle" in some cases in order to be distinguished from other vehicles). As shown in FIG. 1, the embodiment apparatus comprises a driving support ECU 10, an engine ECU 20, a brake ECU 30, an electric parking brake ECU 40, a steering ECU 50, a meter ECU 60, an alert ECU 70, and a navigation ECU 80. It should be noted that, hereinafter, the driving support ECU 10 is referred to as a "DSECU 10" and the electric parking brake ECU 40 is referred to as an "EPB ECU 40".

Each of those ECUs is an electronic control unit comprising a microcomputer as a main part. The ECUs are connected with each other via CAN (Controller Area Network) which is not illustrated so that they are capable of mutually transmitting and receiving information. The microcomputer includes a CPU, a ROM, a RAM, a readable and writable non-volatile memory, and an interface I/F. The CPU is configured to implement various functions by executing instructions (programs, routines) stored in the ROM.

The DSECU 10 is connected to sensors (including switches) described below, and is configured to obtain/receive a detection signal or an output signal of each of the sensors, every time a predetermined time elapses. It should be noted that each of the sensors may be connected to one of the ECUs other than the DSECU 10.

An accelerator pedal operation amount sensor 11 detects an operation amount (an accelerator opening) of an accelerator pedal 11a of the own vehicle and outputs a signal indicative of an accelerator pedal operation amount AP. A brake pedal operation amount sensor 12 detects an operation amount of a brake pedal 12a of the own vehicle and outputs a signal indicative of a brake pedal operation amount BP. A stop lamp switch 13 outputs a low level signal when the brake pedal 12a is not being depressed (is not being operated) and outputs a high level signal when the brake pedal 12a is being depressed (is being operated).

A steering angle sensor 14 detects a steering angle of the own vehicle and outputs a signal indicative of a steering angle θ. A steering, torque sensor 15 detects a steering torque applied to a steering shaft US of the own vehicle by an operation of a steering wheel SW and outputs a signal indicative of a steering torque Tra. A vehicle speed sensor 16 detects a traveling speed (a vehicle speed) of the own vehicle and outputs a signal indicative of a vehicle speed SPD.

A peripheral sensor 17 obtains information on at least any one of a road in front of (ahead of) the own vehicle and target objects (moving objects such as a pedestrian, a bicycle, and a motor vehicle; and stationary objects such as a utility pole and a guardrail).

The peripheral sensor 17 comprises a radar sensor and a camera sensor which are well known. It should be noted that the camera sensor is sometimes referred to as an "imaging device", for convenience.

The radar sensor emits an electric wave in a millimeter waveband to a peripheral area (surroundings) of the own vehicle including a front area of the own vehicle and receives the electric wave (i.e., a reflected wave) reflected from the target object present within the emitted area. The radar sensor obtains, every time a predetermined time elapses, "information (referred to as "target object information") on a relative relationship between the own vehicle and the target object", based on a phase difference between the transmitted electric wave and the received reflected wave, an attenuation level of the reflected wave, a time from a point in time of transmitting the electric wave to a point in time of receiving the reflected wave, and the like.

The camera sensor photographs landscapes of a left side area and a right side area in front of the vehicle to obtain a left-and-right pair of images (image data). The camera sensor outputs "presence or absence of the target object and the target object information" based on the obtained image data. The DSECU 10 synthesizes the information output from each of the radar sensor and the camera sensor to thereby determine the target object information.

Furthermore, the camera sensor recognizes a left lane marker and a right lane marker (hereinafter, referred to as "white lines") provided on a road (an own lane) on which the own vehicle is traveling based on road image data corresponding to image data expressing/representing the road (an image of the road) included in the image data. The camera sensor outputs the information on a lane width W, a road shape (a shape of the road), and a positional relationship between the road and the own vehicle. In addition, the camera sensor extracts image data (traffic sign image data) corresponding to image data expressing/representing an image of a traffic sigh included in the image data and outputs information (mainly, a type of the road) represented by that the traffic sign based on the traffic sign image data. The information (including the target object information) by the peripheral sensor 17 is referred to as "peripheral information".

An operation switch 18 is a switch to be operated by the driver. The driver can select whether or not a lane keeping assist control (LTA: Lane Tracing Assist control) is performed by operating the operation switch 18. In addition, the driver can select whether or not a trailing-travel inter-vehicle-distance control (ACC: Adaptive Cruise Control) is performed by operating, the operation switch 18.

A yaw rate sensor 19 detects a yaw rate of the own vehicle to output an actual yaw rate YRa.

The DSECU 10 is capable of performing the lane keeping assist control and the trailing-travel inter-vehicle-distance control. The lane keeping assist control is a control to change the steering angle (a steering angle of steered wheels) automatically so as to maintain a position of the own vehicle in the vicinity of a target traveling line within "the lane (a traveling lane) on which the vehicle is traveling". The lane keeping assist control itself is well-known (for example, refer to Japanese Patent Application Laid-Open No. 2008-195402, Japanese Patent Application Laid-Open No. 2010-6279, Japanese Patent Application Laid-Open No, 2018-103863, and Japanese Patent No. 4349210).

The trailing, inter-vehicle distance control is a control to make the own vehicle trail a preceding vehicle traveling right ahead the own vehicle, while keeping an inter-vehicle distance between the preceding vehicle and the own vehicle to be/at a predetermined distance. The trailing inter-vehicle distance control itself is well known (for example, refer to Japanese Patent Applications Laid-Open No. 2014-148293, Japanese Patent No. 4172434, Japanese No. 4929777, and the like).

The engine ECU 20 is connected to an engine actuator 21 for changing a driving state of an internal combustion engine 22. In this embodiment, the internal combustion engine 22 is a gasoline-fuel-injection spark-ignition multi-cylinder engine. The engine actuator 21 includes at least a throttle valve actuator to change an opening degree of a throttle valve.

The engine ECU 20 can change a torque generated by the internal combustion engine 22 by driving the engine actuator 21. The torque generated by the internal combustion engine 22 is transmitted to drive wheels (not shown) through a transmission (not shown), a fluid torque converter, and the like (not shown). Therefore, the engine ECU 20 can control the engine actuator 21 to control a driving force of the own vehicle, so as to change an acceleration state (acceleration).

It should be noted that if the own vehicle is a hybrid vehicle, the engine ECU 20 can control the driving force generated by at least any one of "an internal combustion engine and an electric motor" serving as driving sources of the vehicle. Furthermore, if the own vehicle is an electric vehicle, the engine ECU 20 controls the electric motor serving as the driving source so as to control the driving force of the own vehicle.

The brake ECU 30 is connected to a brake actuator 31. The brake actuator 31 is provided at a hydraulic circuit between a master cylinder (not shown) to compress operating fluid depending on a depression force of the brake pedal 12a and friction brake mechanisms 32 provided at left-and-right-front wheels and left-and-right-rear wheels.

The brake actuator 31 adjusts, in response to an instruction from the brake ECU 30, a hydraulic pressure of the operating fluid supplied to a wheel cylinder which is built in the brake caliper 32b and operates the wheel cylinder with the hydraulic pressure. Thereby, the brake actuator 31 presses a brake pad onto the brake disc 32a to generate a friction brake force. Accordingly, the brake ECU 30 controls the brake actuator 31 to thereby be able to control a brake force of the own vehicle.

The EPB ECU 40 is connected to a parking brake actuator 41 (hereinafter, may be referred to as a "PKB actuator 41"). The parking brake actuator 41 is an actuator for pressing the brake pad onto the brake disc 32a Therefore, the EPB ECU 40 applies a parking brake force to the wheels to thereby maintain the own vehicle in a stopped state, using the PKB actuator 41.

The steering ECU 50 is a control device of a well-known electric powered steering system and is connected to a motor driver 51. The motor driver 51 is connected to a steering motor 52. The steering motor 52 is assembled in a "steering mechanism (not shown) of the own vehicle including the steering wheel SW, the steering shaft US connected to the steering wheel SW, a steering gear mechanism (not shown), and the like". The steering motor 52 generates a torque by an electric power supplied from the motor driver 51 and uses the torque to thereby apply a steering assist torque to the steering shaft US and steer the right and left steered wheels.

The meter ECU 60 is connected to a digital display meter (not shown), a hazard lamp 61 and a stop lamp 62. The meter ECU 60 blinks the hazard lamp 61 and lights the stop lamp 62, depending on an instruction sent from the DSECU 10.

The alert ECU 70 is connected to a buzzer 71 and a display device 72. The alert ECU 70 can, depending on an instruction from the DSECU 10, make the buzzer 71 sound to alert the driver, make a mark for alerting (for example, a warning lamp) light on the display device 72, and display an operating state of a driving support control on the display device 72.

The navigation ECU 80 is connected to a GPS receiver 81 which receives a "signal (for example, a GPS signal)" obtained for detecting a present position of the own vehicle and sent from a satellite, a map database 82 which has stored map information including road information, a touch screen type display 83, and the like. It should be noted that, as well known, those GPS receiver 81, the map database 82, and the touch screen type display 83 are used for a route guidance executed by the navigation ECU 80, and accordingly, the device including them is also referred to as a "navigation device".

The navigation ECU 80 obtains (determines) the present position of the own vehicle based on the GPS signal. The map information stored in the map database 82 includes information on type-of-road information, the road shape, and a speed limit of the road. The type-of-road information is information for determining/identifying the type of the road (the traveling road) on which the own vehicle is traveling. It should be noted that the map information stored in the map database 82 may be information which is obtained by the navigation ECU 80 through communication with the outside of the own vehicle.

The navigation ECU 80 identifies/determines the type of the road on which the own vehicle is traveling at the present time point based on the present position of the own vehicle and the map information (the type-of-road information) to output the identified/determined type of the road to the DSECU 10.

The types of roads are roughly classified into a "specific road" and a "road other than specific road". The specific road is also referred to as a "vehicle exclusive road (a road for exclusive use of the vehicle)".

The specific road is mainly used for traffic of the motor vehicle (the motor vehicle which meets a specific condition, such as an automobile and a motorcycle) and is a road on which the bicycles and the pedestrians are prohibited to travel. In addition, the specific road is a road that is connected to another roads at limited and specific places (for example, interchanges or junctions). That is, access to the specific road are limited. The road other than the specific road is a road which allows the motor vehicles, the bicycles, and the pedestrians to travel and can be freely entered into and exited from the roadside, except when there is a side road. That is, the access to "the road other than the specific road" is not limited.

For example, in Japan, the specific road includes an expressway national road (Category 1 road stipulated in the Japanese Road Structure Ordinance) and a motor high way (Category 2 road stipulated in the Japanese Road Structure Ordinance). In Japan, the road other than the specific road is categorized as a general road.

<Outline of Operation>

The DSECU 10 determines whether or not the driver is under the abnormal state (i.e., the inability-in-driving abnormality state) while the own vehicle is traveling on the road. The abnormal state is a state in which the driver loses an ability to drive the vehicle. When a "state (also referred to as a "no driving operation state") in which it can be regarded that there is no driving operation of the own vehicle" has continued for a predetermined time or more, the DSECU 10 determines that the driver is under (or has fallen into) the abnormal state. It should be noted that, as will be described later, a determination method of whether or not the driver is under the abnormal state is not limited to the above-described determination method.

The no driving operation state is a state in which all of parameter(s) (in this embodiment, AP, BP, and Tra) included in a combination selected from one or more of "the accelerator pedal operation amount AP, the brake pedal operation amount BP, and the steering torque Tra" has/have not changed.

When the DSECU 10 determines that the driver is under the abnormal state, it performs, as described below, any one of controls which are different from each other depending on whether or not the own vehicle is traveling on the specific road (i.e., the vehicle exclusive road). It should be noted that the determination of whether or not the own vehicle is traveling on the specific road is referred to as a "specific road determination" or a "vehicle exclusive road determination".

(When the Own Vehicle is Traveling on the Specific Road)

When it is determined that the driver is under the abnormal state and the road on which the own vehicle is traveling is the specific road, the DSECU 10 executes a deceleration stop control which is a kind of the deceleration control.

The deceleration stop control is a control to decrease the vehicle speed SPD of the own vehicle to zero ("0") (i.e., until the own vehicle stops) at a predetermined deceleration α (for example, a constant deceleration α). The DSECU 10 controls the engine actuator 21 using the engine ECU 20, and when needed, controls the brake actuator 31 using the brake ECU 30, in such a manner that the actual deceleration of the own vehicle matches (becomes equal to) the predetermined deceleration α.

When the vehicle speed SPD of the own vehicle becomes/reaches "0" through the deceleration stop control, the DSECU 10 stops the deceleration stop control, and thereafter, executes a stopped state maintaining control. The stopped state maintaining control is a control to apply the parking brake force to the wheels using the EPB ECU 40 to thereby maintain the own vehicle in the stopped state.

(When the Own Vehicle is Traveling on the Road (i.e., the General Road) Other than the Specific Road)

Meanwhile, if the above-described deceleration stop control and the above-described stopped state maintaining control are executed in a case where it is determined that the driver is under the abnormal state and the road on which the own vehicle is traveling is not the specific road, there may arise a case where the own vehicle stops at the inappropriate place (i.e., the intersection, the railroad crossing, or the like).

In view of the above, when it is determined that the driver is under the abnormal state and the road on which the own vehicle is traveling is not the specific road, the DSECU 10 executes the deceleration control until the vehicle speed SPD becomes/reaches a "predetermined vehicle speed SPDlow which is a low vehicle speed higher than "0".

When the vehicle speed SPD becomes/reaches the "predetermined vehicle speed SPDlow", the DSECU 10 stops the deceleration control and executes a low speed traveling control in place of the deceleration control.

The low speed traveling control is a control to maintain the vehicle speed SPD within a predetermined low vehicle speed range through adjustment of the driving force and/or the brake force of the own vehicle. That low vehicle speed range is a range which is higher than a lower limit set vehicle speed higher than 0 km/h and is lower than a higher limit set vehicle speed. The above-described predetermined vehicle speed SPDlow (for example, 10 km/h) is set to a predetermined value within that low vehicle speed range that includes the lower limit set vehicle speed and the higher limit set vehicle speed.

In this embodiment, the DSECU 10 sets a state of the own vehicle to a creep traveling state to thereby realize/achieve the low speed traveling control. The creep traveling state is a state in which the own vehicle travels at a low speed when the internal combustion engine 22 is maintained in an idling state in which neither the accelerator pedal 11a nor the brake pedal 12a is operated. It should be noted that when the own vehicle is traveling on a downhill road and the vehicle speed is higher than the higher limit set vehicle speed, the DSECU 10 generates the brake force to thereby maintain the vehicle speed SPD at the higher limit set vehicle speed. When the own vehicle is traveling on a climbing road and the vehicle speed is lower than the lower limit set vehicle speed, the DSECU 10 increases the driving force to thereby maintain the vehicle speed SPD at the lower limit set vehicle speed.

Furthermore, if the own vehicle is the hybrid vehicle or the electric vehicle, the DSECU 10 controls the driving force and/or the brake force of the own vehicle in such a manner that the own vehicle travels at a predetermined vehicle speed within the low vehicle speed range. That traveling state of the vehicle is also referred to as the "creep traveling state", for convenience.

In the above-described manner, the DSECU 10 causes the own vehicle to continue traveling at the low speed without stopping the own vehicle when the own vehicle is traveling on the general road. Therefore, the own vehicle is not stopped at any of the inappropriate places. Furthermore, since the own vehicle does not continue traveling at the high speed, it is possible to decrease a possibility, that the own vehicle gives a risk/threat to the pedestrians, the bicycles, or the like.

<Specific Operation>

The CPU of the DSECU 10 is configured to execute each of routines represented by flowcharts shown in FIGS. 2 to 5, every time a predetermined time elapses.

Figure 2:
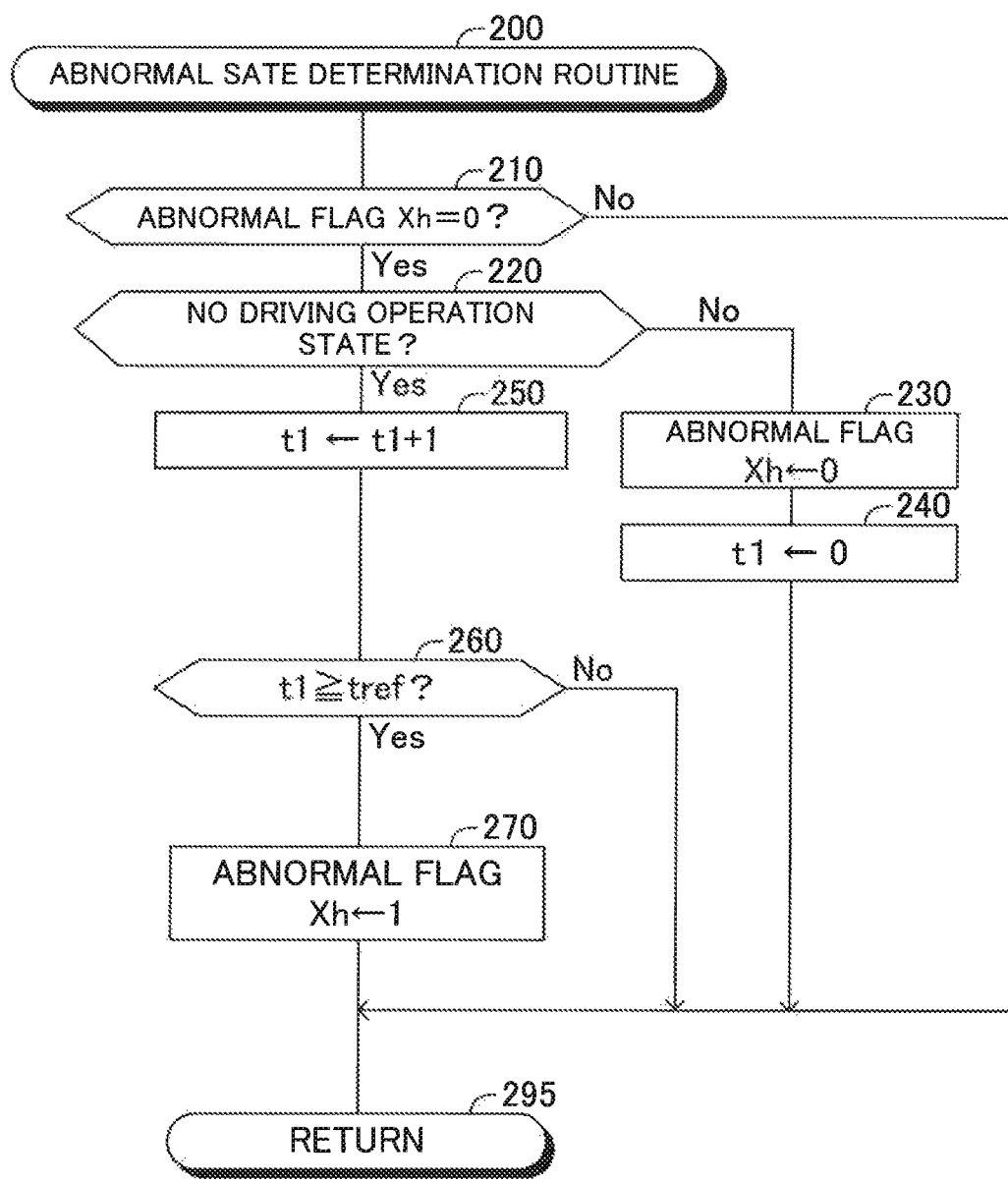
FIG. 2 is a flowchart showing a routine executed by a CPU shown in FIG. 1.

Therefore, when a predetermined timing arrives, the CPU starts processing from step 200 of FIG. 2 and proceeds to step 210 to determine whether or not a value of an abnormal flag Xh is "0". The abnormal flag Xh indicates, when its value is "1", that a state of the driver at the present time point is the "abnormal state". The abnormal flag Xh indicates, when its value is "0", that the state of the driver at the present time point is a "normal state" which is other than the abnormal state. It should be noted that the value of the abnormal flag Xh is set to "0" through an initialization routine (not shown) executed by the CPU when an ignition key switch (not shown) of the own vehicle is chanced from an OFF position to an ON position.

When the value of the abnormal flag Xh is "1", the CPU makes a "No" determination at step 210 and proceeds to step 295 to tentatively terminate the present routine. In contrast, when the value of the abnormal flag Xh is "0", the CPU makes a "Yes" determination at step 210 and proceeds to step 220 to determine whether or not the driver is in a state (the above-described no driving operation state) in which the driver does not perform the driving operation. That is, when each/any of the accelerator pedal operation amount AP, the brake pedal operation amount BP, and the steering torque Tra has not changed between a time point at the previous execution of this routine and the present time point, the CPU determines that the driver of the own vehicle is in the no driving operation state.

When the driver of the own vehicle is not in the no driving operation state, the CPU makes a "No" determination at step 220 and sequentially executes the processes of steps 230 and 240 described below. Thereafter, the CPU proceeds to step 295 to tentatively terminate the present routine.

Step 230: the CPU sets a value of the abnormal flag Xh to "0".

Step 240: the CPU sets a value of an abnormal determination timer t1 to "0".

In contrast, when the driver is in the no driving operation state, the CPU makes a "Yes" determination at step 220 and proceeds to step 250 to increase the value of the abnormal determination timer t1 by "1".

Thereafter, the CPU proceeds to step 260 to determine whether or not the value of the abnormal determination timer t1 is equal to or larger than an abnormal confirmation time t1ref which has been set in advance. When the abnormal determination timer t1 is smaller than the abnormal confirmation time t1ref, the CPU makes a "No" determination at step 260 and proceeds to step 295 to tentatively terminate the present routine. As understood above, when the no driving operation state continues, the value of the abnormal determination timer t1 is increased through the process of the step 250. That is, the value of the abnormal determination timer t1 represents a time in/for which the no driving operation state continues.

For this reason, the no driving operation state continues when the driver is under the abnormal state, and consequently, the abnormal determination timer t1 becomes equal to or larger than the abnormal confirmation time t1ref. In this case, when the CPU proceeds to step 260, the CPU makes a "Yes" determination at step 260 and proceeds to step 270 to set the value of the abnormal flag Xh to "1". In other words, the CPU determines that the driver becomes/is under the abnormal state. Thereafter, the CPU proceeds to step 295 to tentatively terminate the present routine.

Figure 3:
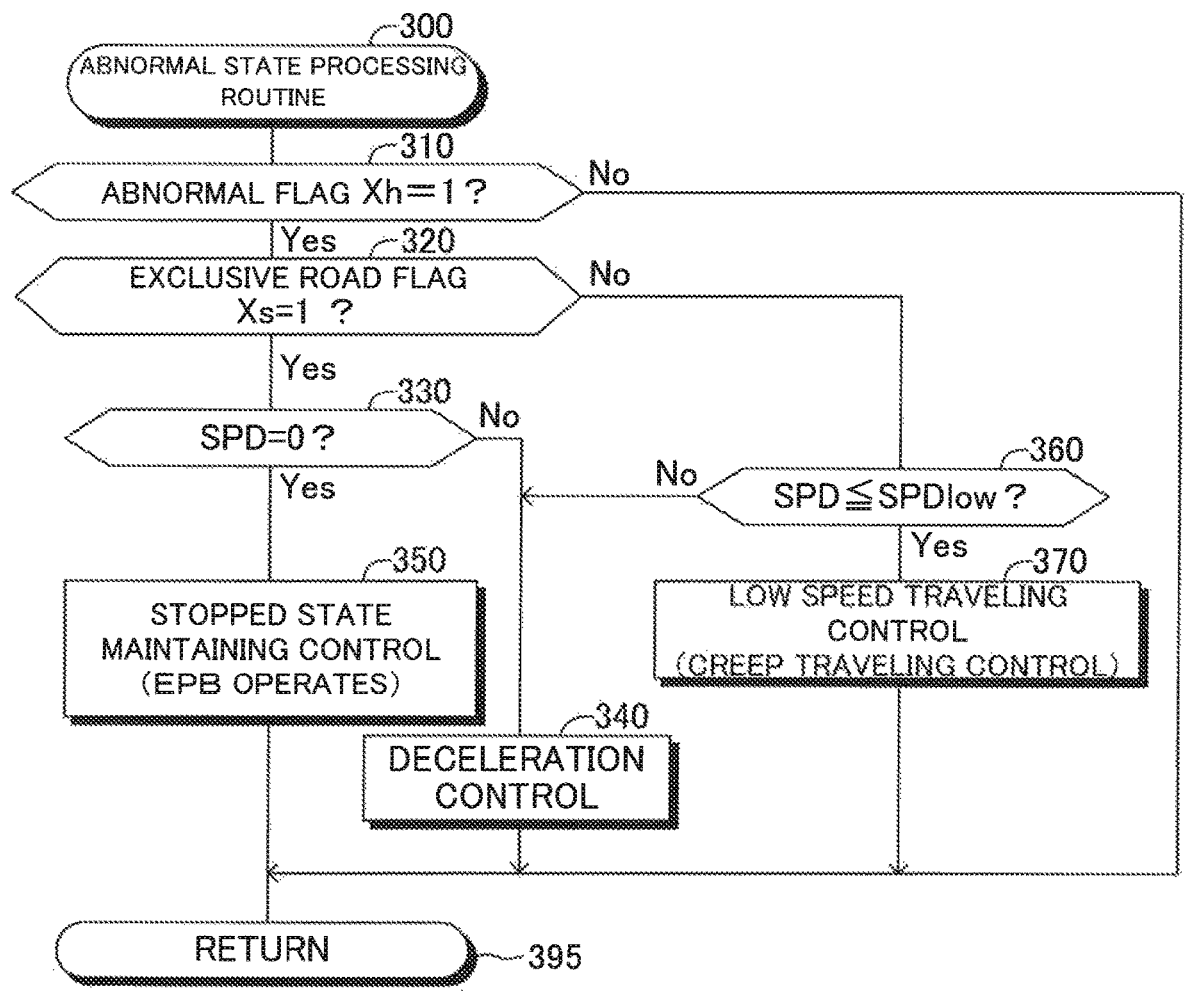
FIG. 3 is a flowchart showing a routine executed by the CPU shown in FIG. 1.

When a predetermined timing arrives, the CPU starts processing from step 300 shown in FIG. 3 and proceeds to step 310 to determine whether or not the value of the abnormal flag Xh is "1". When the value of the abnormal flag Xh is "0", the CPU makes a "No" determination at step 310 and proceeds to step 395 to tentatively terminate the present routine.

In contrast, when the value of the abnormal flag Xh is "1" (i.e., it has been determined that the driver is under the abnormal state), the CPU makes a "Yes" determination at step 310 and proceeds to step 320 to determine whether or not the value of an exclusive road flag Xs is "1".

The exclusive road flag Xs indicates, when its value is "1", that the road on which the own vehicle is traveling at the present time point is the specific road (in other words, the own vehicle is located within the specific road). The exclusive road flag Xs indicates, when its value is "0", that the road on which the own vehicle is traveling at the present time point is the road other than the specific road (in other words, the own vehicle is not located within the specific road). The value of the exclusive road flag Xs is set to "0" through the above-described initialization routine. Furthermore, the value of the exclusive road flag Xs is changed through the routines of FIGS. 4 and 5 which will be described later.

Here, assuming that the value of the exclusive road flag Xs is "1". In this case, the CPU makes a "Yes" determination at step 320, proceeds to step 330 and determines whether or not the own vehicle has stopped (i.e., whether or not the vehicle speed SPD is "0").

When the vehicle speed SPD is not "0" (i.e., when the own vehicle has not sopped and is still moving), the CPU makes a "No" determination at step 330 and proceeds to step 340 to execute the deceleration control. That is, the CPU decelerates the own vehicle at the predetermined deceleration α which is a constant value and has been set in advance. Thereafter, the CPU proceeds to step 395 to tentatively terminate the present routine.

Thereafter, since the process of step 340 is repeatedly executed, the vehicle speed SPD of the own vehicle gradually decreases to reach "0". That, is, the own vehicle stops. In this case, the CPU makes a "Yes" determination at step 330 and proceeds to step 350 to execute the stopped state maintaining control. That is, the CPU applies the parking brake force to the wheels using the EPB ECU 40. Thereby, the DSECU 10 maintains the own vehicle in the stopped state. Thereafter, the CPU proceeds to step 395 to tentatively terminate the present routine.

In this manner, when the value of the abnormal flag Xh is "1" and the exclusive road flag Xs is "1", the deceleration control is executed until the own vehicle completely stops, and the stopped state maintaining control is executed after the own vehicle has completely stopped.

On the other hand, assuming that the value of the exclusive road lag Xs is "0" in a case where the value of the abnormal flag Xh has changed from "0" to "1", the CPU makes a "Yes" determination at step 310, and makes a "No" determination at step 320 to proceed to step 360. At step 360, the CPU determines whether or not the vehicle speed SPD of the own vehicle is equal to or lower than a predetermined vehicle speed SPDlow.

When the vehicle speed SPD is higher than the predetermined vehicle speed SPDlow, the CPU makes a "No" determination at step 360 and proceeds to step 340 to execute the above-described deceleration control Thereafter, the CPU proceeds to step 395 to tentatively terminate the present routine.

Thereafter, the process of step 340 is repeatedly executed, and consequently, the vehicle speed SPD of the own vehicle gradually decreases to reach the predetermined vehicle speed SPDlow. In this case, since the vehicle speed SPD is equal to or lower than the predetermined vehicle speed SPDlow, the CPU makes a "Yes" determination at step 360 and proceeds to step 370 to execute the low speed traveling control (in this case, a creep traveling control). Thereby, the traveling state of the own vehicle is switched/changed from that deceleration traveling state to the low speed traveling state. Thereafter, the CPU proceeds to step 395 to tentatively terminate the present routine. After this time point, the CPU repeatedly executes the process of step 370.

In this manner, when the value of the abnormal flag Xh is "1" and the value of the exclusive road flag Xs is "0", the deceleration control is executed until the vehicle speed SPD reaches the predetermined vehicle speed SPDlow, and the low speed traveling control is executed after the vehicle speed SPD reaches the predetermined vehicle speed. SPDlow. Therefore, the own vehicle does not stop at the inappropriate place so as to continue traveling at a low speed so as not to give the risk/threat to the pedestrians, the bicycles, or the like.

It should be noted that when the value of the abnormal flag Xh has been set to "1", the DSECU 10 performs the lane keeping assist control automatically even when the lane keeping assist control has not been selected by the operation switch 18. Furthermore, when the value of the abnormal flag Xh is set to "1" in a case where the lane keeping assist control has been selected by the operation switch 18, the DSECU 10 continues performing the lane keeping assist control.

Figure 4:
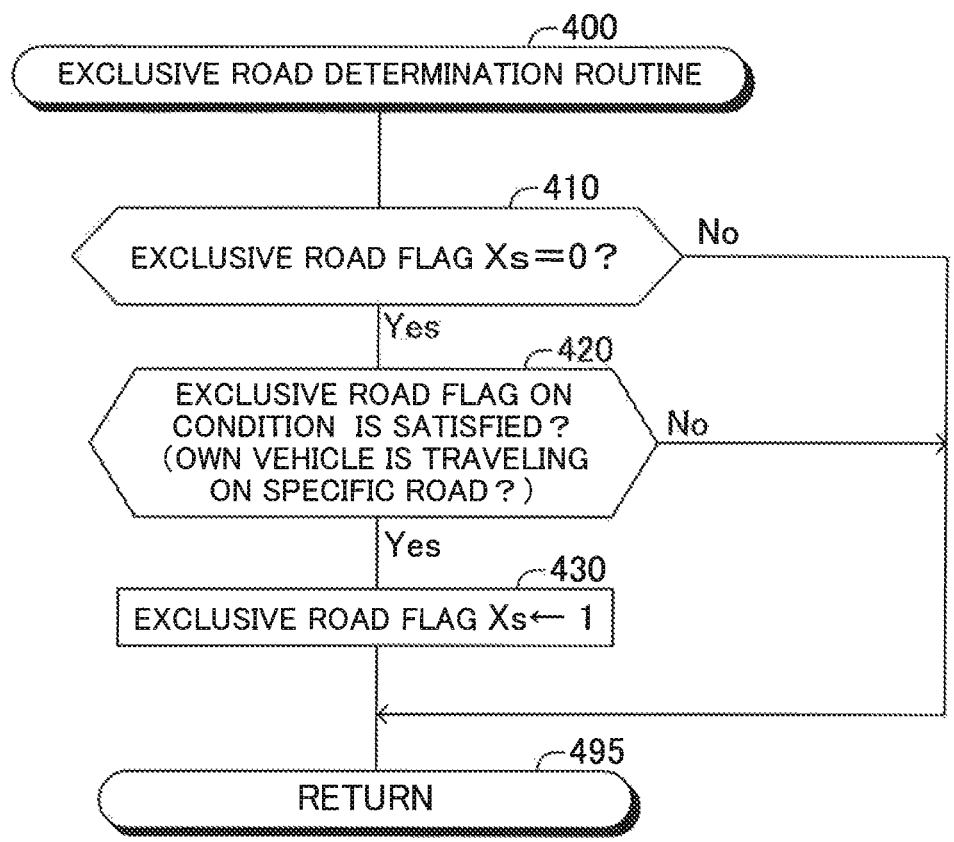
FIG. 4 is a flowchart showing a routine executed by the CPU shown in FIG. 1.

When a predetermined timing arrives, the CPU starts processing from step 400 shown in FIG. 4 and proceeds to step 410 to determine whether or not the value of the exclusive road flag Xs has been set to "0".

When the value of the exclusive road flag Xs is "1", the CPU makes a "No" determination at step 410 and directly proceeds to step 495 to tentatively terminate the present routine. In contrast, when the value of exclusive road flag Xs is "0" the CPU makes a "Yes" determination at, step 410 and proceeds to step 420 to sequentially execute the following processes.

The CPU obtains the lane width W of the lane (the road) on which the own vehicle is located/traveling from the peripheral sensor 17 (the camera sensor). It should be noted that the CPU may obtain the image data from the camera sensor and may calculate the lane width W based on the obtained image data.

The CPU obtains the vehicle speed SPD from the vehicle speed sensor 16.

The CPU determines whether or not an exclusive road flag ON condition described below is satisfied using the lane width W and the vehicle speed SPD.

When the exclusive road flag ON condition is satisfied, the CPU determines that the own vehicle is located/traveling on the specific road.

(Exclusive Road Flag ON Condition)

The exclusive road flag ON condition is a condition to be satisfied when both of the following conditions 1 and 2 are satisfied.

The condition 1; the condition 1 is a condition to be satisfied when the lane width W is equal to or larger than a predetermined lower limit lane width WLoth (a lower limit lane width threshold).

The condition 2 the condition 2 is a condition to be satisfied when the vehicle speed SPD is equal to or higher than a lower limit vehicle speed SPDLoth (a lower limit vehicle speed threshold).

The predetermined lower limit lane width WLoth in the condition 1 is set to a value appropriate for a determination of whether or not a lane on which the own vehicle is traveling/is located is a lane of the specific road. For example, each of laws of various countries defines a lower limit value and an upper limit value of the lane width of the specific road. Therefore, the predetermined lower limit lane width WLoth is set based on the lower limit value of the lane width defined for the specific road by the law. Therefore, when the condition 1 is satisfied, the lane is likely to be the lane of the specific road. It should be noted that the condition 1 may be a condition to be satisfied when the lane width W is equal to or larger the predetermined lower limit lane width WLoth and is equal to or smaller than the upper limit lane width WHith. In this case, the upper limit lane width WHith is set based on the upper limit value of the lane width defined for the specific road by the law.

Furthermore, the lower limit vehicle speed SPDLoth in the condition 2 is a value appropriate for a determination of whether or not the lane on which the own vehicle is located/traveling is the specific road. Similarly to the lane width, each of the laws of the various countries defines the lower limit value and the upper limit value of a speed limit of the specific road. Therefore, the lower limit vehicle speed SPDLoth is set based on the lower limit value of the speed limit defined for the specific road by the law. Thus, when the condition 2 is satisfied, the lane is highly likely to be the lane of the specific road. It should be noted that the condition 2 may be a condition to be satisfied when the vehicle speed SPD is equal to or higher than the lower limit, vehicle speed SPDLoth and is equal to or lower than the upper limit vehicle speed SPDHith. The upper limit vehicle speed SPDHith in this case is set based on the upper limit value of the speed limit defined for the specific road by the law.

When the exclusive road flag ON condition is satisfied (i.e., when it is determined that the own vehicle is located on the specific road), the CPU makes a "Yes" determination at step 420 and proceeds to step 430 to set the value of the exclusive road flag Xs to "1", Thereafter, the CPU proceeds to step 495 to tentatively terminate the present routine. In contrast, when the exclusive road flag, ON condition is not satisfied, the CPU makes a "No" determination at step 420 and proceeds to step 495 to tentatively terminate the present routine. In this case, the value of the exclusive road flag Xs is maintained at "0".

Figure 5:
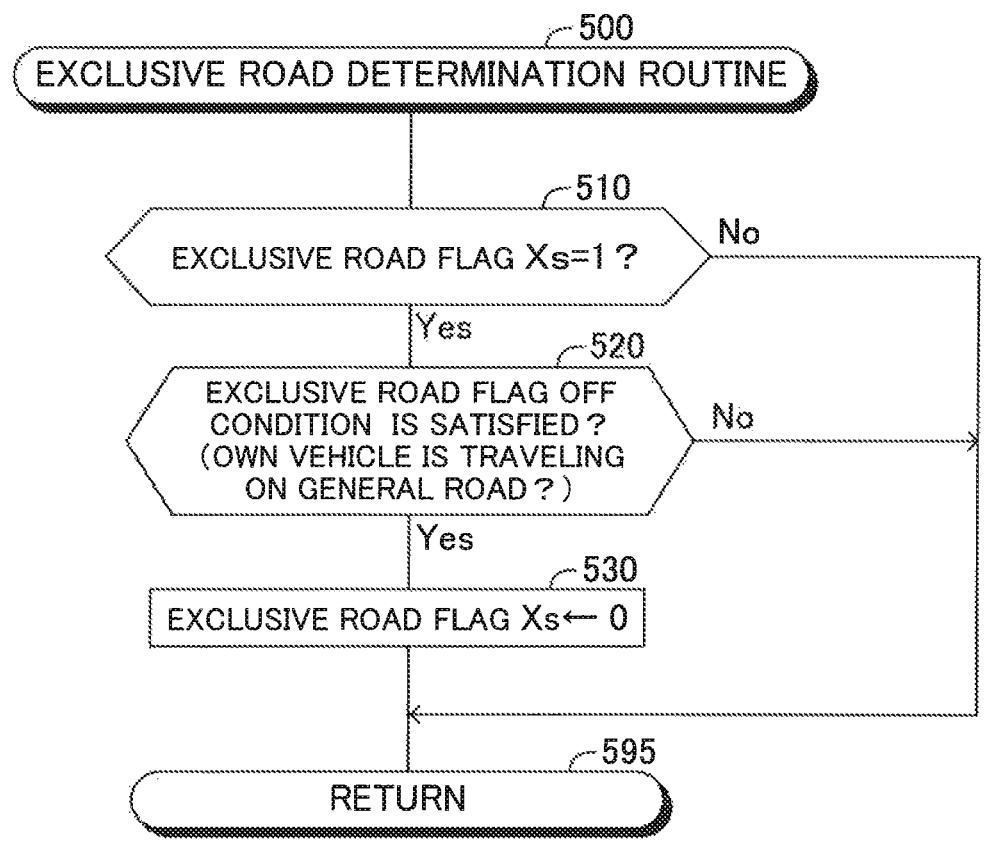
FIG. 5 is a flowchart showing a routine executed by the CPU shown in FIG. 1.

When a predetermined timing arrives, the CPU starts processing from the step 500 shown in FIG. 5 and proceeds to step 510 to determine whether or not the value of the exclusive road flag Xs has been set to "1". When the value of the exclusive road flag Xs is "0", the CPU makes a "No" determination at step 510 and proceeds to step 595 to tentatively terminate the present routine. In contrast, when the value of the exclusive road flag Xs is "1", the CPU makes a "Yes" determination at step 510 and proceeds to step 520 to execute the following processes.

The CPU obtains the lane width W and the vehicle speed SPD through the same process as the process of step 420.

The CPU determines whether or not the following, exclusive road flag OFF condition is satisfied using/based on the lane width W and the vehicle speed SPD.

When the exclusive road flag OFF condition is satisfied, the CPU determines that the own vehicle has not been located/traveling on the specific road.

(Exclusive Road Flag OFF Condition)

The exclusive road flag OFF condition is a condition to be satisfied when the following condition 3 is satisfied.

Condition 3: the lane width W is smaller than the predetermined lower limit lane width WLoth.

It should be noted that the exclusive road flag OFF condition may be a condition to be satisfied when at least any one of the above-described condition 3 and the following condition 4 is satisfied.

Condition 4: the condition 4 is a condition to be satisfied when the lane width W is larger than the above-described upper lane width WHith.

It should be noted that, in order to determine whether or not the exclusive road flag. OFF condition is satisfied, the lane width W is used, but the vehicle speed SPD is not used. This is because if the determination is made using the vehicle speed SPD, it may be determined that the own vehicle is not located on the specific road even when the own vehicle is traveling on the specific road, because the vehicle speed SPD is decreased through the deceleration control.

When the exclusive road flag OFF condition is satisfied (i.e., when it is determined that the own vehicle is not located on the specific road, in other words, when it is determined that the own vehicle is located on the general road), the CPU makes a "Yes" determination at step 520 and proceeds to step 530 to set the value of the exclusive road flag Xs to "0". Thereafter, the CPU proceeds to step 595 to tentatively terminate the present routine.

In contrast, when the exclusive road flag OFF condition is not satisfied, the CPU makes a "No" determination at step 520 and proceeds to step 595 to tentatively terminate the present routine. In this case, the value of the exclusive road flag Xs is maintained at "1".

As described above, when the embodiment apparatus determines that the own vehicle is not located on the specific road in a case where the driver is under the abnormal state, it decelerates the vehicle down to the predetermined speed, and thereafter, continues causing the own vehicle to travel at the low speed. Therefore, the embodiment apparatus can decrease a possibility that the own vehicle is stopped at the inappropriate place. Furthermore, the embodiment apparatus can decrease the risk/threat (a risk/threat caused by travel of the own vehicle at a high speed) which is given to the road users (for example, the pedestrians and the bicycles) other than the automobile The present disclosure is not limited to the above-described embodiment, and various modifications based on the technical idea of the present disclosure are possible.

For example, the DSECU 10 may obtain information (the type-of-road information) indicative of the type of the road on which the own vehicle is located from the navigation device and may determine whether or not the own vehicle is located on the specific road based on the type-of-road information.

Alternatively, the DSECU 10 may determine whether or not the own vehicle is located on the specific road based on "Information (the type-of-road information) indicative of the type of road represented by the traffic sign" included in the peripheral information sent from the camera sensor. Further alternatively, the DSECU 10 may extract traffic sign image data corresponding to image data expressing/representing the traffic sign included in the image data obtained by the camera sensor, may extract the type-of-road information from the extracted traffic sign image data, and may determine whether or not the own vehicle is located on the specific road based on the type-of-road information.

As yet another example, the DSECU 10 may communicate with a roadside communication device installed on a roadside to thereby obtain the type-of-road information of the road on which the own vehicle is located and may determine whether or not the own vehicle is located on the specific road based on the obtained type-of-road information.

In these modifications, when that type-of-road information indicates one of the specific roads, the CPU determines that the exclusive road flag ON condition at step 420 is satisfied. When that type-of-road information indicates the road other than the specific road, the CPU determines that the exclusive road flag OFF condition at step 520 is satisfied.

Furthermore, the DSECU 10 may determine whether or not the driver is under the inability-in-driving abnormality state using so-called a "driver monitoring technique", disclosed in Japanese Patent Application Laid-Open No 2013-152700, for example. Briefly describing, the vehicle traveling control apparatus having the driver monitoring technique photographs the driver using a camera provided on members (for example, the steering wheel SW and pillars) in a vehicle cabin to obtain image data of the driver. Furthermore, the vehicle traveling control apparatus monitors a direction of a sight line of the driver and a direction of a face of the driver using the obtained image data. When any one of the direction of the sight line of the driver and the direction of the face of the driver faces in a direction in which the driver does not face for a long time while driving the vehicle normally, the vehicle traveling control apparatus determines that the driver is under the inability-in-driving abnormality state.

Furthermore, the DSECU 10 may prompt/urge the driver of the own vehicle to operate a "confirmation button (not shown) that the driver in the normal state can operate", every time a constant first time elapses, and may determine that the driver is under the inability-in-driving abnormality state when a state where no operation of the confirmation button is made continues for a second time longer than the constant first time, or more.

Figure 6:
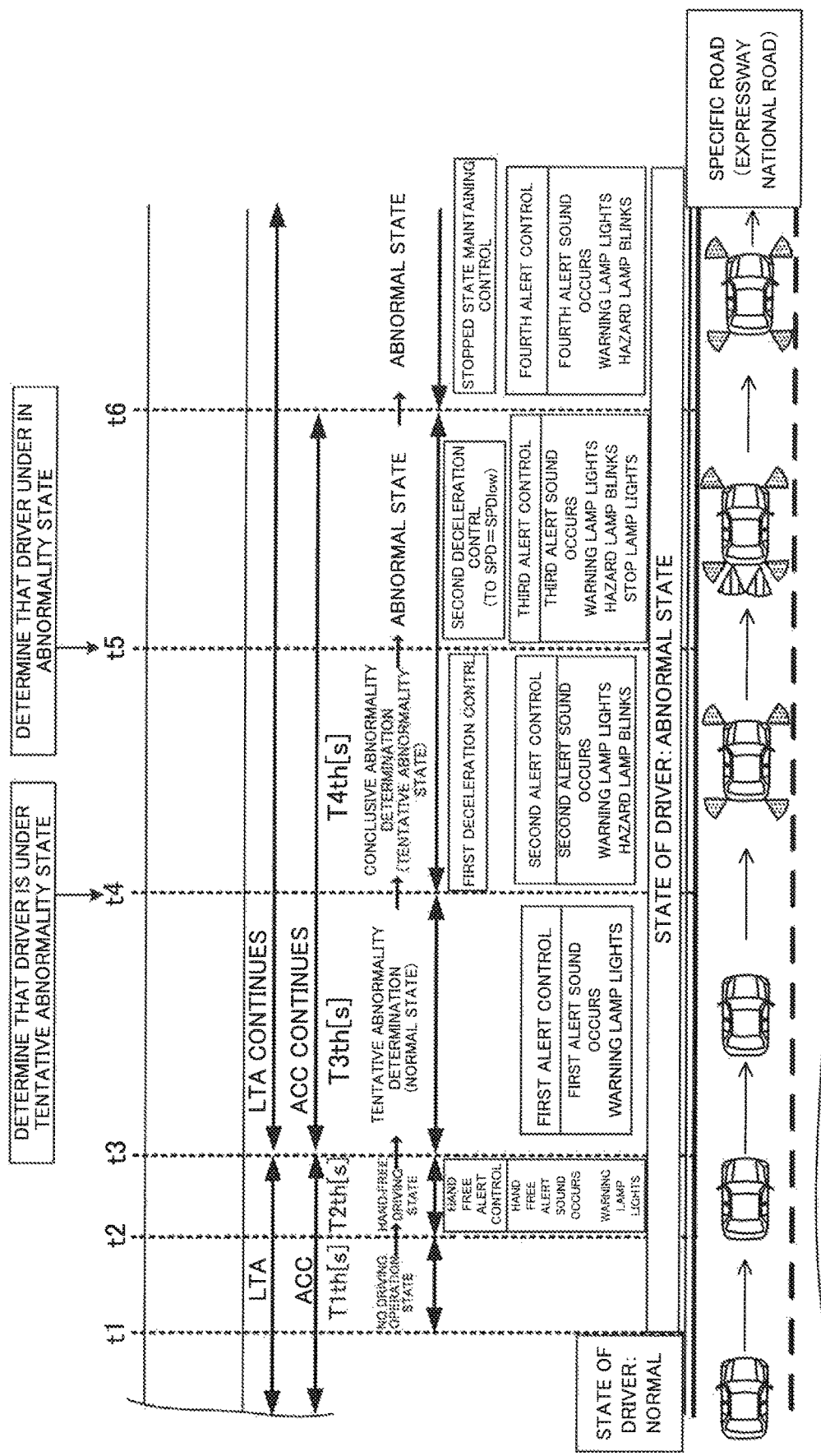
FIG. 6 is a time chart for explaining a modification.

In addition, the DSECU 10 may make a determination of whether or not the driver is under the abnormal state and may perform a vehicle control of when the determination that the driver is under the abnormal state is made, in a manner described using an example shown in FIG. 6.

That is, FIG. 6 illustrates the example where the own vehicle is traveling on the specific road under the execution of the lane keeping assist control (LTA) and the trailing-travel inter-vehicle-distance control (ACC). In this example, the driver becomes under the abnormal state at time t1. After the time t1, the no driving operation state continues. The DSECU 10 continues determining whether or not the no driving operation state continues.

The DSECU 10 determines that the driver is in a hand-free driving state at time t2 at which the no driving operation state of the steering wheel SW has continued for a first threshold time T1th from time t1 to start a "hand free alert control". In the hand free alert control, an "alert which urges the driver to hold the steering wheel SW" is generated/issued.

At time t3 at which the no driving operation state has continued for a second time T2th from time t2, the DSECU 10 starts a first alert control for executing/issuing a first alert whose degree of the alert is stronger than a degree of the alert by the hand free alert control. For example, the first alert is the alert with a sound louder than a sound of the hand free alert. It should be noted that the DSECU 10 does not change a driving state of the own vehicle. That is, the LTA and the ACC that have been performed up to the time t3 are continued after the time t3.

The DSECU 10 determines that the driver has become under a tentative abnormality state at t4 at which the no driving operation state has continued for a third threshold time T3th from the time t3. Therefore, at time t4, the DSECU 10 starts a second alert control for executing/issuing a second alert whose degree of the alert is stronger than the degree of the first alert. For example, the second alert is the alert with a sound louder than, the sound of the first alert. At the same time, the DSECU 10 starts a first deceleration control to gradually decelerate the own vehicle at a first deceleration α1. It should be noted that the DSECU 10 still continues the LTA just as before the time t3, but performs the ACC while adjusting/changing the vehicle speed SPD so as to give priority to the first deceleration control.

The DSECU 10 determines conclusively that the driver has been under the inability-in-driving abnormality state at time t5 at which the no driving operation state has continued for a fourth threshold time T4th from the time t4. After the time, the DSECU 10 executes any one of controls which are different from each other depending on whether or not the own vehicle is located on the specific road.

In the example shown in FIG. 6, the own vehicle is located on the specific road. For this reason, the DSECU 10 starts a third alert control for executing a third alert whose degree is stronger than the degree of the second alert at time t5. For example, the third alert is the alert with a sound louder than the sound of the second alert. Furthermore, the DSECU 10 starts a second deceleration to decelerate the own vehicle rapidly at a "second deceleration α2 having an absolute value larger than an absolute value of the first deceleration α1". The DSECU 10 still continues the LTA just as before the time t5, but performs the ACC while adjusting/changing the vehicle speed SPD so as to give priority to the second deceleration control.

At time t6 at which the vehicle speed SPD becomes zero through the second, deceleration control, the DSECU 10 stops the LTA, the ACC, the second deceleration control, and the third alert control, and thereafter, starts the above-described stopped state maintaining control with the parking brake force and a fourth alert control. The fourth alert control is a control for executing a fourth alert whose degree is stronger than the degree of the third alert. For example, the fourth alert is the alert with a sound louder than the sound of the third alert.

Figure 7:
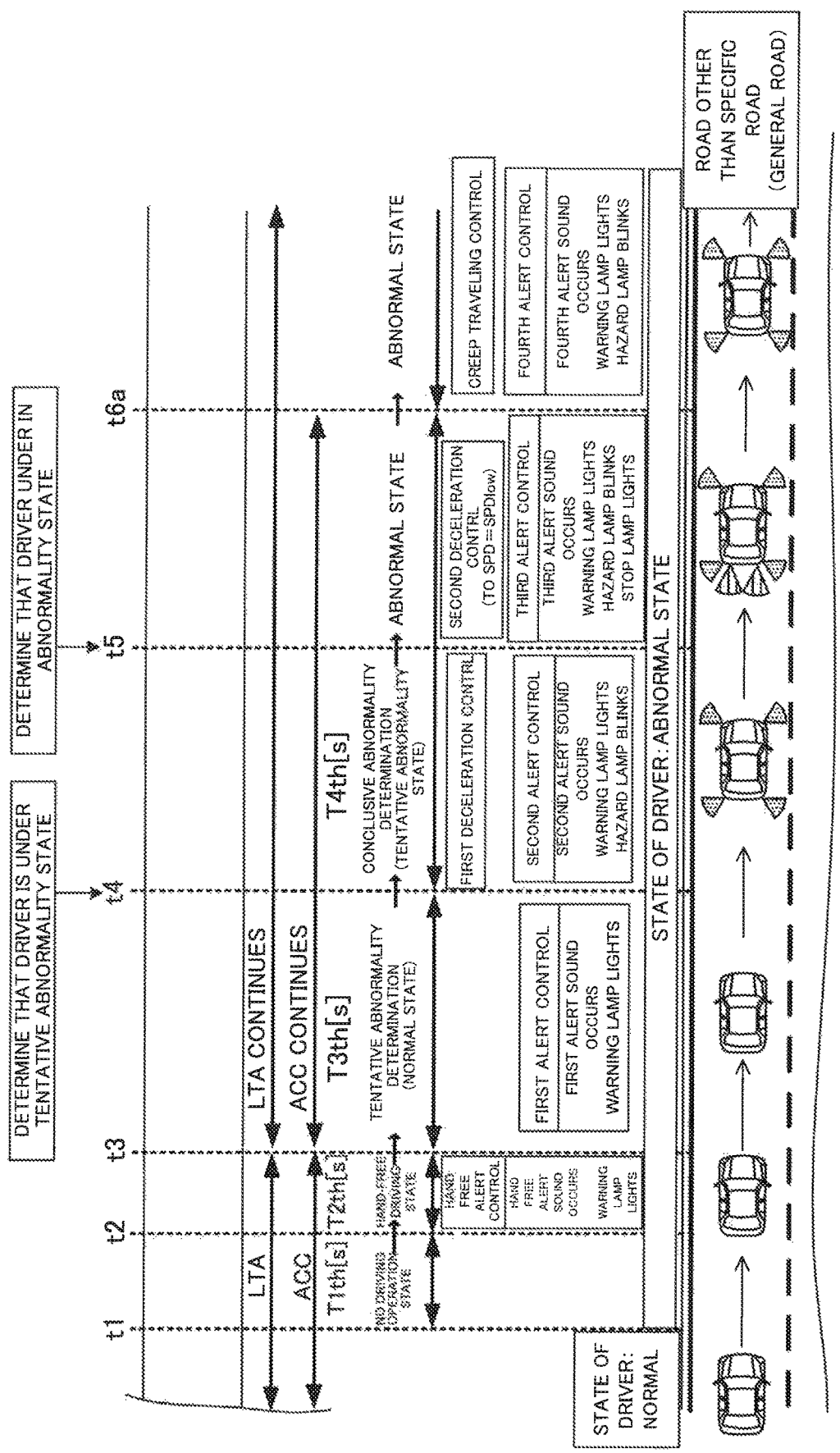
FIG. 7 is a time chart for explaining the modification.

FIG. 7 illustrates an example in which the own vehicle is traveling on the road (the general road) other than the specific road. The own vehicle is equipped with the same modification which has been described using FIG. 6. In this example, the same control as the above-described example is executed until time t5 at which the conclusive determination that the driver is under the abnormal state has been made.

In the example shown in FIG. 7, the DSECU 10 starts the third alert control after time t5 and executes the second deceleration control until time t6a at which the vehicle speed SPD matches (becomes equal to) the predetermined vehicle speed SPDlow. Furthermore, at the time t6a, the DSECU 10 stops both of the second deceleration control and the third alert control; and thereafter, starts the low traveling control and the fourth alert control.

Further, alternatively, the DSECU 10 may execute a constant speed traveling control that causes the own vehicle to run at a low constant speed for the low speed traveling control, in place of the creep traveling control. More specifically, the DSECU 10 sets the target speed to a predetermined speed within the above-described low vehicle speed range and determines the target acceleration Gtgt so as to match the actual vehicle speed SPD with the target vehicle speed. Thereafter, the DSECU 10 controls the engine actuator 21 through the engine ECU 20, and when, needed, controls the brake actuator 31 through the brake ECU 30 in such a manner that the actual acceleration (a time derivative of vehicle speed SPD) of the own vehicle matches the target acceleration Gtgt.

What is claimed is:

1. A vehicle traveling control apparatus applied to a vehicle comprising:

an information obtaining device configured to obtain information at least on a road on which said vehicle is traveling;

an actuator configured to control a driving force of said vehicle and a brake force of said vehicle; and an electronic control unit configured to:

determine whether or not a driver of said vehicle is under an abnormal state where said driver losses an ability to drive said vehicle;

determine whether said vehicle is on a vehicle exclusive road or on a general road other than said vehicle exclusive road based on said information, the said vehicle exclusive road is used for a motor vehicle which meets a specific condition and on which a bicycle and a pedestrian are prohibited from traveling; and execute a deceleration control using said actuator to decelerate said vehicle after an abnormal determination time point at which it is determined that said driver is under said abnormal state, wherein, said electronic control unit is configured to, after said abnormal determination time point:

decrease a speed of said vehicle to zero to thereby stop said vehicle through said deceleration control when it is determined that said vehicle is on said vehicle exclusive road regardless of a shape of the road; and decrease said speed of said vehicle to a predetermined vehicle speed which is within a low vehicle speed range which is higher than zero through said deceleration control, and thereafter, continue causing said vehicle to travel at a low speed within said low vehicle speed range, when it is determined that said vehicle is on said general road other than said vehicle exclusive road regardless of the shape of the road.

2. The vehicle traveling control apparatus according to claim 1, wherein, said information obtaining device includes:

an imaging device configured to photograph a peripheral area of said vehicle to thereby obtain image data; and a vehicle speed sensor configured to detect said speed of said vehicle, and said electronic control unit is configured to:

determine whether or not each of a first condition and a second condition is satisfied, said first condition being a condition to be satisfied when a lane width is equal to or larger than a lower limit lane width, said lane width being a distance between a left lane marker on a left side of said vehicle and a right lane marker on a right side of said vehicle, said left and right markers being recognized based on road image data corresponding to a road included in said image data, said second condition being a condition to be satisfied when said detected speed is equal to or higher than a lower limit vehicle speed threshold; and determine that said vehicle is on said vehicle exclusive road when both of said first condition and said second condition are determined to be satisfied.

3. A vehicle traveling control apparatus applied to a vehicle comprising:

an information obtaining device configured to obtain information at least on a road on which said vehicle is traveling, said information obtaining device includes an imaging device configured to photograph a peripheral area of said vehicle to thereby obtain image data, and a vehicle speed sensor configured to detect a speed of said vehicle;

an actuator configured to control a driving force of said vehicle and a brake force of said vehicle; and an electronic control unit configured to:
- determine whether or not a driver of said vehicle is under an abnormal state where said driver losses an ability to drive said vehicle;
- determine whether or not said vehicle is on a vehicle exclusive road based on said information; and
- execute a deceleration control using said actuator to decelerate said vehicle after an abnormal determination time point at which it is determined that said driver is under said abnormal state, wherein, said electronic control unit is configured to, after said abnormal determination time point:
- decrease said speed of said vehicle to zero to thereby stop said vehicle through said deceleration control when it is determined that said vehicle is on said vehicle exclusive road;
- decrease said speed of said vehicle to a predetermined vehicle speed which is within a low vehicle speed range which is higher than zero through said deceleration control, and thereafter, continue causing said vehicle to travel at a low speed within said low vehicle speed range, when it is determined that said vehicle is not on said vehicle exclusive road;
- determine whether or not each of a first condition and a second condition is satisfied, said first condition being a condition to be satisfied when a lane width is equal to or larger than a lower limit lane width, said lane width being a distance between a left lane marker on a left side of said vehicle and a right lane marker on a right side of said vehicle, said left and right markers being recognized based on road image data corresponding to a road included in said image data, said second condition being a condition to be satisfied when said detected speed is equal to or higher than a lower limit vehicle speed threshold; and
- determine that said vehicle is on said vehicle exclusive road when both of said first condition and said second condition are determined to be satisfied.

* * * * *